(12) United States Patent
Sohag et al.

(10) Patent No.: US 11,862,816 B2
(45) Date of Patent: Jan. 2, 2024

(54) BATTERY PACK WITH OVERMOLDED BUSBARS PROVIDING PARALLEL COOLING PATHS

(71) Applicant: GM GLOBAL TECHNOLOGY OPERATIONS LLC, Detroit, MI (US)

(72) Inventors: Faruk A Sohag, Canton, MI (US); Ethan T. Quy, Royal Oak, MI (US); Robert J. Schoenherr, Oxford, MI (US); Nicholas R. Bratton, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 625 days.

(21) Appl. No.: 16/915,843

(22) Filed: Jun. 29, 2020

(65) Prior Publication Data

US 2021/0408514 A1    Dec. 30, 2021

(51) Int. Cl.
*H01M 50/502* (2021.01)
*H01M 10/6554* (2014.01)
*H01M 10/613* (2014.01)
*H01M 50/20* (2021.01)
*H01M 10/48* (2006.01)
*H01M 10/625* (2014.01)
*H01M 10/647* (2014.01)

(52) U.S. Cl.
CPC ....... *H01M 50/502* (2021.01); *H01M 10/482* (2013.01); *H01M 10/613* (2015.04); *H01M 10/625* (2015.04); *H01M 10/647* (2015.04); *H01M 10/6554* (2015.04); *H01M 50/20* (2021.01); *H01M 2220/20* (2013.01)

(58) Field of Classification Search
CPC ......... H01M 10/6553; H01M 10/6554; H01M 10/6556; H01M 50/507; H01M 10/482; H01M 10/613; H01M 10/625; H01M 10/647; H01M 50/20; H01M 50/249; H01M 50/502; H01M 2220/20; Y02E 60/10
See application file for complete search history.

(56) References Cited

U.S. PATENT DOCUMENTS

| 2019/0074557 A1* | 3/2019 | Shin | H01M 50/502 |
| 2019/0198952 A1* | 6/2019 | Choi | H01M 50/291 |
| 2020/0259152 A1* | 8/2020 | Lee | H01M 50/528 |
| 2021/0013478 A1* | 1/2021 | Sasaki | H01M 50/264 |

* cited by examiner

*Primary Examiner* — Stewart A Fraser
*Assistant Examiner* — Lilia Nedialkova
(74) *Attorney, Agent, or Firm* — Quinn IP Law (57) ABSTRACT

A battery pack includes battery cells and an interconnect board assembly (ICBA) having a dielectric ICB and parallel busbars. A cell tab protrudes from an edge of the cells and joined to the busbars. A dielectric ICB is connected to the busbars at one distal end of the busbars. The dielectric material of the ICB is overmolded onto another distal end such that the ICB wraps around the busbars to form overmolded ends. The overmolded ends are received within a pocket of a bracket to form direct parallel cooling paths to a heat sink. A method of manufacturing the battery pack includes arranging the busbars in parallel, overmolding dielectric material onto ends of the busbars to form overmolded ends, and attaching the busbars to a plastic ICB formed from the dielectric material. The ICBA is then attached to the bracket and cells.

18 Claims, 4 Drawing Sheets

BATTERY PACK WITH OVERMOLDED BUSBARS PROVIDING PARALLEL COOLING PATHS

Electrical circuits of the types commonly used to regulate operation of rotary electric machines, air conditioning compressors, and other high-power loads typically include a high-voltage power supply in the form of an electrochemical battery pack. For example, electric powertrains typically include a lithium-ion or nickel-metal hydride battery pack constructed from one or more battery modules. An electric motor is energized by discharging the individual battery modules to provide output torque to a coupled load.

A battery pack configured for powering a vehicle propulsion system or another high-voltage load contains an application-suitable arrangement or stack of individual battery cells. In a typical battery cell, relatively thin cathode and anode plates are spaced apart by separators within an electrolyte fluid and sealed within an outer pouch. Positive and negative electrode extensions or cell tabs of each of the constituent battery cells may protrude a short distance from an edge of the pouch to enable the cell tabs to be conductively joined to a high-voltage power busbar.

High-voltage battery packs tend to experience substantial levels of Joule heating during sustained operation. Such heating is prevalent at or along welded or bonded joints connecting the individual cell tabs to the busbars of a high-voltage bus. Over time, heat generated at these and other locations within the battery pack may have a deleterious effect on power efficiency and structural integrity of the battery cells. As an example of the latter, heat-induced degradation of polymeric seal material surrounding the protruding cell tabs may allow captive electrolyte fluid to leak from the cell pouch. Thermal management systems are therefore used to closely regulate battery temperature, with such systems typically functioning via the controlled circulation of a suitable battery coolant to and from the various battery cells.

SUMMARY

A battery pack is disclosed herein along with associated methods of constructing and cooling a battery pack having the disclosed construction. The battery pack, which may be optionally embodied as one or more battery modules, is in thermal communication with a heat sink, which may be a generally planar cooling manifold or cooling plate, a housing or enclosure of the battery pack, or another suitable heat sink in various embodiments. Heat transfer to the heat sink typically occurs over a highly-resistive path from the various cell tab-to-busbar interfaces through intervening material of the battery pack. As a result, current battery cooling approaches may provide suboptimal cooling and potential battery pack degradation.

The present teachings are intended to facilitate temperature regulation of a battery pack by overmolding designated end portions of a set of voltage busbars with dielectric material when constructing an interconnect board (ICB). As will be appreciated by those of ordinary skill in the art, an ICB is used to interconnect the various battery cells, and may also support sensors, processing chips, and other electronic components in the overall control and regulation of the battery pack.

The busbars and ICB, in other words, are integrated together via an overmolding process that leaves active/high-current surfaces of the busbars exposed for subsequent conductive joining of the cell tabs. At the same time, the dielectric material covering the distal ends of the busbars serves as part of a high-voltage barrier between the bus bars and the heat sink, while at the same time facilitating heat transfer into the heat sink via one or more brackets as set forth herein.

In an exemplary embodiment of the battery pack as described herein, the battery pack includes a housing, a plurality of battery cells arranged therein, an elongated bracket connected to a heat sink, and an ICB assembly (ICBA). In this particular embodiment, the ICBA has a parallel set of busbars, each of which is conductively joined to one or more of the battery cells via corresponding battery cell tabs. An ICB of the ICBA is constructed from plastic or another dielectric material, with some of the dielectric material being overmolded onto a distal end of each respective one of the busbars to form a plurality of overmolded ends. The overmolded ends extend at least partially into a bracket pocket of the elongated bracket to form a cooling path into the heat sink from each of the busbars. Multiple parallel cooling paths from the parallel busbars are thus created in this manner when the ICBA is racked to the battery cells and mated with the heat sink via the elongated bracket.

The overmolded ends of the busbars are bonded to the elongated bracket within the bracket pocket using a thermal interface material (TIM). The TIM and the dielectric material together form the high-voltage barrier between the busbars and the heat sink.

In some embodiments, the elongated bracket is a single continuous bracket arranged along a perimeter edge of the heat sink, and the bracket pocket is a single continuous bracket pocket configured to receive the overmolded ends therein. The single continuous bracket pocket may have a predetermined shape suitable for retaining the TIM, e.g., a generally U-shaped, L-shaped, or V-shaped cross-section or another suitable cross-sectional shape.

The elongated bracket in still other embodiments includes multiple separate elongated brackets, i.e., shorter bracket segments spaced apart from each other by short distances. In such embodiments, several smaller bracket pockets are individually configured to receive therein a different one of the overmolded ends.

The dielectric material of the overmolded ends may optionally define a corresponding window or through-opening through which a predetermined surface area of the busbars is exposed.

The battery pack in certain configurations may be electrically connected to a rotary electric machine of an electric powertrain and configured to energize rotation thereof.

An ICBA is also disclosed herein for use with a battery pack having battery cells, with the battery cells having corresponding anode and cathode cell tabs. An embodiment of the ICBA includes a parallel set of busbars each with respective first and second distal ends. The busbars are configured to be conductively joined to a respective one or more of the cell tabs during assembly of the battery pack.

As noted above, the ICBA includes an ICB constructed from a suitable dielectric material, with the ICB connected to each of the busbars at the respective first distal end. The dielectric material of the ICB is also overmolded onto each of the busbars such that the dielectric material wraps around the respective second distal end of each the busbars to form a plurality of overmolded ends. The overmolded ends are configured to extend into the bracket pocket during the assembly of the battery pack to form multiple parallel cooling paths into the heat sink from each of the busbars.

A method for constructing the battery pack may include arranging a plurality of busbars in parallel, with each of the busbars in this embodiment possibly constructed from an electrically conductive material. The method includes overmolding a dielectric material onto a distal end of each of the busbars to form a plurality of overmolded ends, and then attaching another distal end of each of the busbars to an ICB formed from the dielectric material. The ICBA may be connected to the battery cells. Thereafter, the constructed battery pack may be connected to an electric machine in still other embodiments.

The above features and advantages and other features and advantages will be readily apparent from the following detailed description when taken in connection with the accompanying drawings.

DETAILED DESCRIPTION

Representative applications of devices and associated methods according to the present application are described in this section. Various representative embodiments are provided to provide context and aid in the understanding of the described teachings. It will be understood by those skilled in the art that various changes may be made and equivalents substituted for elements of the disclosed solutions without departing from the intended inventive scope as recited in the appended claims.

Figure 1:
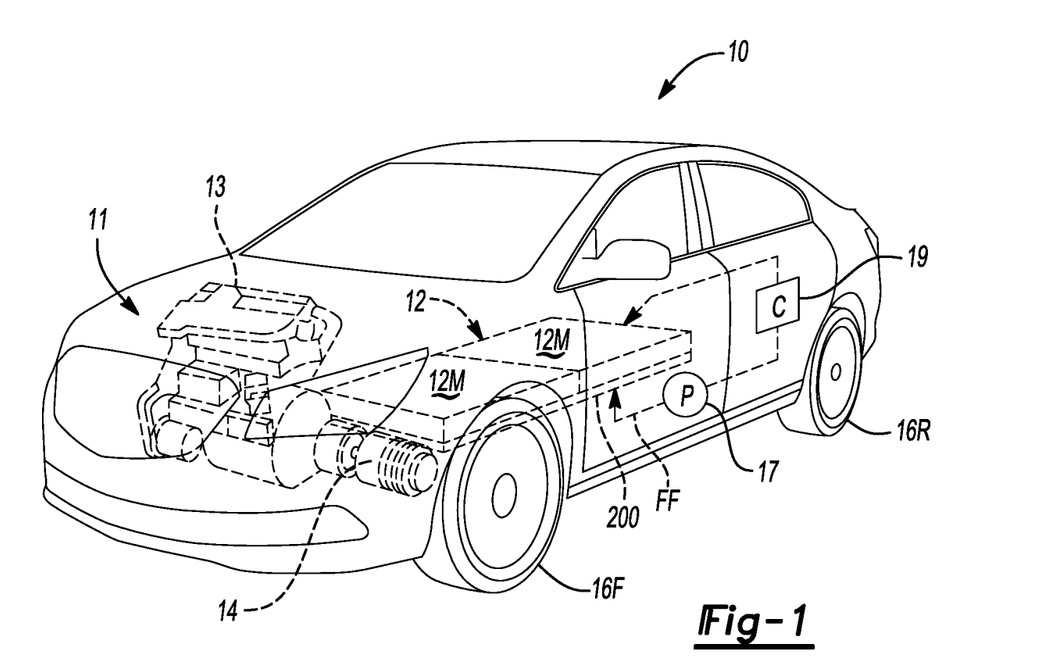
FIG. 1 is a schematic perspective view illustration of an exemplary motor vehicle having an electric propulsion system inclusive of a battery pack constructed according to the present disclosure.

Referring to the drawings, wherein like reference numbers refer to like components throughout the several views, a motor vehicle 10 is depicted schematically in FIG. 1 having an electric powertrain 11. The electric powertrain 11 includes a high-voltage battery pack ($B_{HV}$) 12. In some embodiments, the battery pack 12 may be constructed from one or more constituent battery modules 12M, with two such battery modules 12M depicted in FIG. 1. In other embodiments, the battery pack 12 is not modular, i.e., is constructed and functions as a single battery pack 12. For the purposes of the present disclosure, therefore, the terms "battery pack" and "battery module" are used interchangeably, with one or more of the battery modules 12M possibly functioning as the battery pack 12 in different configurations.

Each battery module 12M is configured as detailed herein with reference to FIGS. 2-5 in order to provide multiple parallel direct cooling paths to a suitable heat sink located within or in proximity to the battery pack 12. Such paths coincide with high-current areas associated with Joule heating within the battery modules 12M, and extend from individual cell-to-busbar joints 31 (see FIG. 2) to such a heat sink, e.g., a resident cooling plate 200 as shown in a non-limiting exemplary embodiment. The transferred heat is thereby dissipated away from the battery pack 12.

The battery pack 12 of FIG. 1 may be used in some applications to energize stator windings (not shown) of a rotary electric machine 14 of the electric powertrain 11 aboard the motor vehicle 10, e.g., a battery electric vehicle as shown or a hybrid electric vehicle using torque from the electric machine 14 in conjunction with another prime mover 13, typically but not necessarily an internal combustion engine. Those of ordinary skill in the art will appreciate that the battery pack 12 and/or one or more battery modules 12M may be used as an onboard power supply in other applications and for other purposes, for instance aboard other types of vehicles such as but not limited to aircraft, watercraft, or rail vehicles, or in non-vehicular applications such as powerplants, hoists, mobile platforms, robots, and the like. Therefore, the exemplary embodiment of FIG. 1 is intended to be illustrative of just one possible system use of the battery pack 12/battery modules 12M.

Each battery module 12M may include and/or share a respective one of the cooling plates 200 or other heat sinks arranged adjacent to or along a major surface of the battery modules 12M. While the cooling plate 200 is depicted in a typical configuration in which the heat sink is the cooling plate 200 and is coextensive with an underside or bottom of the battery modules 12M, the actual location of the relevant heat sink may vary in other applications. In addition, the battery pack 12 may have a relatively flat "pancake" shape as shown, of any number of possible external shapes or aspect ratios, including the depicted rectangular shape of FIG. 1. Such a low-profile configuration may be suitable for reducing packaging space in certain embodiments of the motor vehicle 10.

As will be appreciated by those of ordinary skill in the art, battery cooling functions aboard the motor vehicle 10 and other systems equipped with the electric powertrain 11 often route battery coolant, shown at FF in FIG. 1, through and/or around the individual battery modules 12M via a network of cooling pipes with the assistance of fans, pumps, valves, chillers, radiators, and other components. To further reduce required packaging space and complexity, some cooling systems utilize direct conductive cooling by positioning the battery modules on or adjacent to a cooling plate, with the cooling plate 200 of FIG. 1 being representative. Some configurations preclude direct contact with the cooling plate 200, and thus other structure such as the enclosure or housing 20 (see FIG. 2) may serve in lieu of or in addition to the cooling plate 200. However, given the unique internal construction of the battery modules 12M and the configuration of a typical cooling plate, heat transfer remains less than optimal. The present disclosure is thus intended to address this and other issues within battery packs 12 having one or more battery modules 12M constructed as shown in FIGS. 2-5.

In the non-limiting embodiment of FIG. 1, the electric powertrain 11 is controlled via associated powertrain control circuitry (not shown) to generate and transmit torque generated by the prime mover 13 and/or the rotary electric machine(s) 14 to a driven load, which in FIG. 1 includes front drive wheels 16F and/or rear drive wheels 16R. Alternatively, motor torque from the electric machine 14 may be used solely to crank and start the prime mover 13 when the prime mover 13 embodies an internal combustion engine. The battery pack 12 in the motor vehicle 10 or other systems may employ a lithium-ion, nickel-metal hydride, or other application-suitable high-energy battery chemistry. By way of example and not limitation, the battery pack 12 may include foil pouch-, plate-, or can-style battery cells arranged in a cell stack and electrically connected to provide output voltage at a level sufficient for energizing the electric machine 14, e.g., 300 VDC or more, or 60 VDC or more in certain propulsion operations. Thus, "high-voltage" may have different meanings in different embodiments, with "high-voltage" generally entailing voltage levels in excess of typical 12-15 VDC auxiliary/low-voltage levels.

Figure 2:
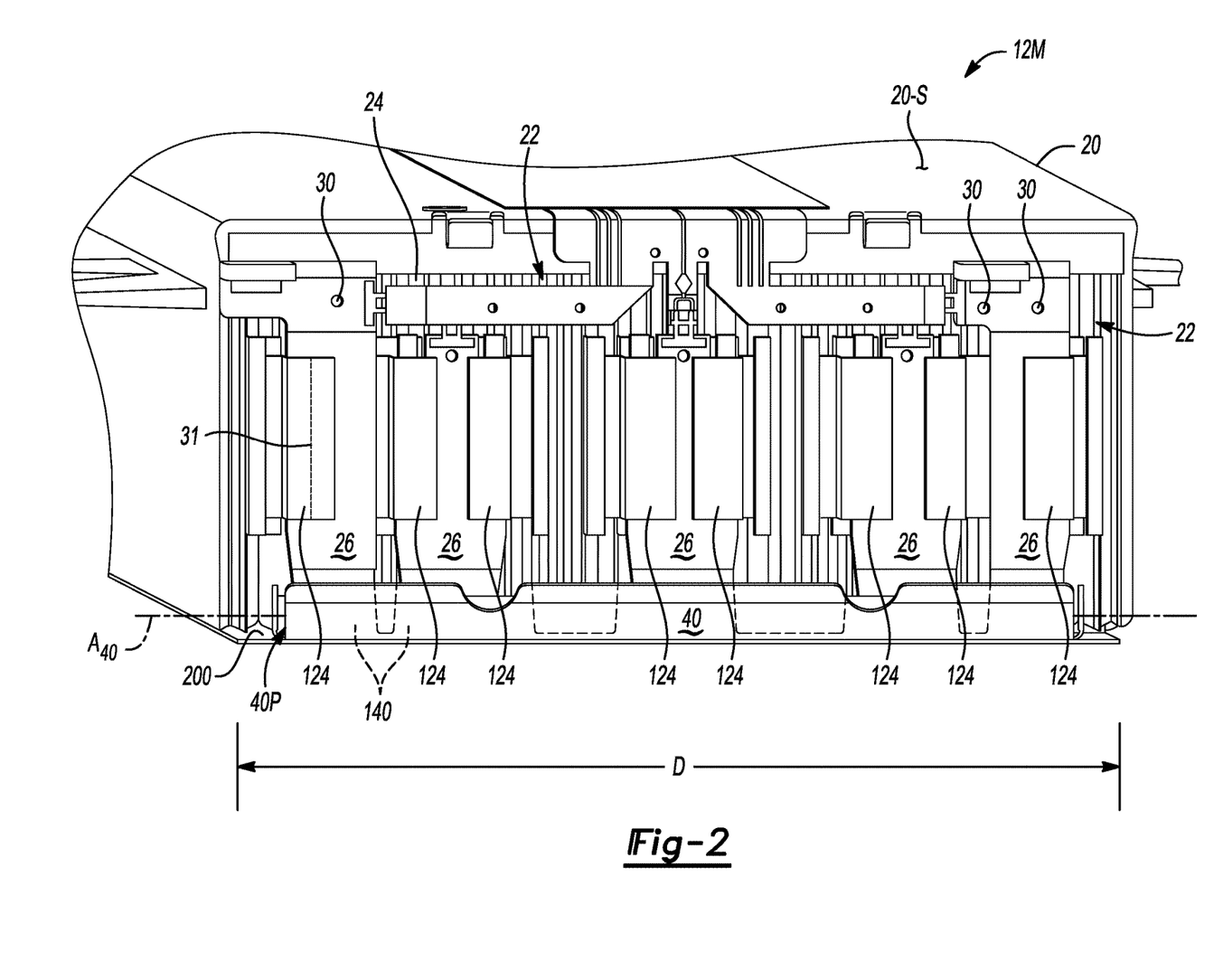
FIG. 2 is a schematic perspective view illustration of a battery pack that is usable as part of the motor vehicle shown in FIG. 1 or in other high-voltage systems.

In order to achieve a relatively high output voltage, the battery modules 12M may be arranged in a particular geometric configuration, such as the flat configuration of FIGS. 1 and 2, and interconnected using a high-voltage bus of the motor vehicle 10. Such a connection connects the individual battery modules 12M to power electronics and a thermal management system. The simplified thermal management system is shown schematically to include a coolant pump (P) 17 configured to circulate battery coolant (arrow FF) to and from the cooling plate 200 in this embodiment, which is adapted as set forth below, and possibly through the battery modules 12M. The heat transfer fluid then passes out of the battery pack 12 through a chiller (C) 19 to help cool the battery pack 12, with the reverse operation likewise possible when warming of the battery pack 12 is required.

Other common thermal management system components are omitted for illustrative simplicity, including directional and thermal expansion valves, thermostats, radiators, heat exchangers, etc. Additionally, while associated power electronics are omitted from FIG. 1 for illustrative simplicity, such components typically include a power inverter module using pulse width modulation (PWM)-controlled semiconductor switches to invert a DC voltage from the battery pack 12 into an alternating current voltage (VAC) for powering the electric machine 14, a DC-DC converter or auxiliary power module for reducing the voltage level from the battery pack 12 to auxiliary (e.g., 12-15 VDC) levels sufficient for powering auxiliary electrical systems aboard the vehicle 10.

Figure 4:
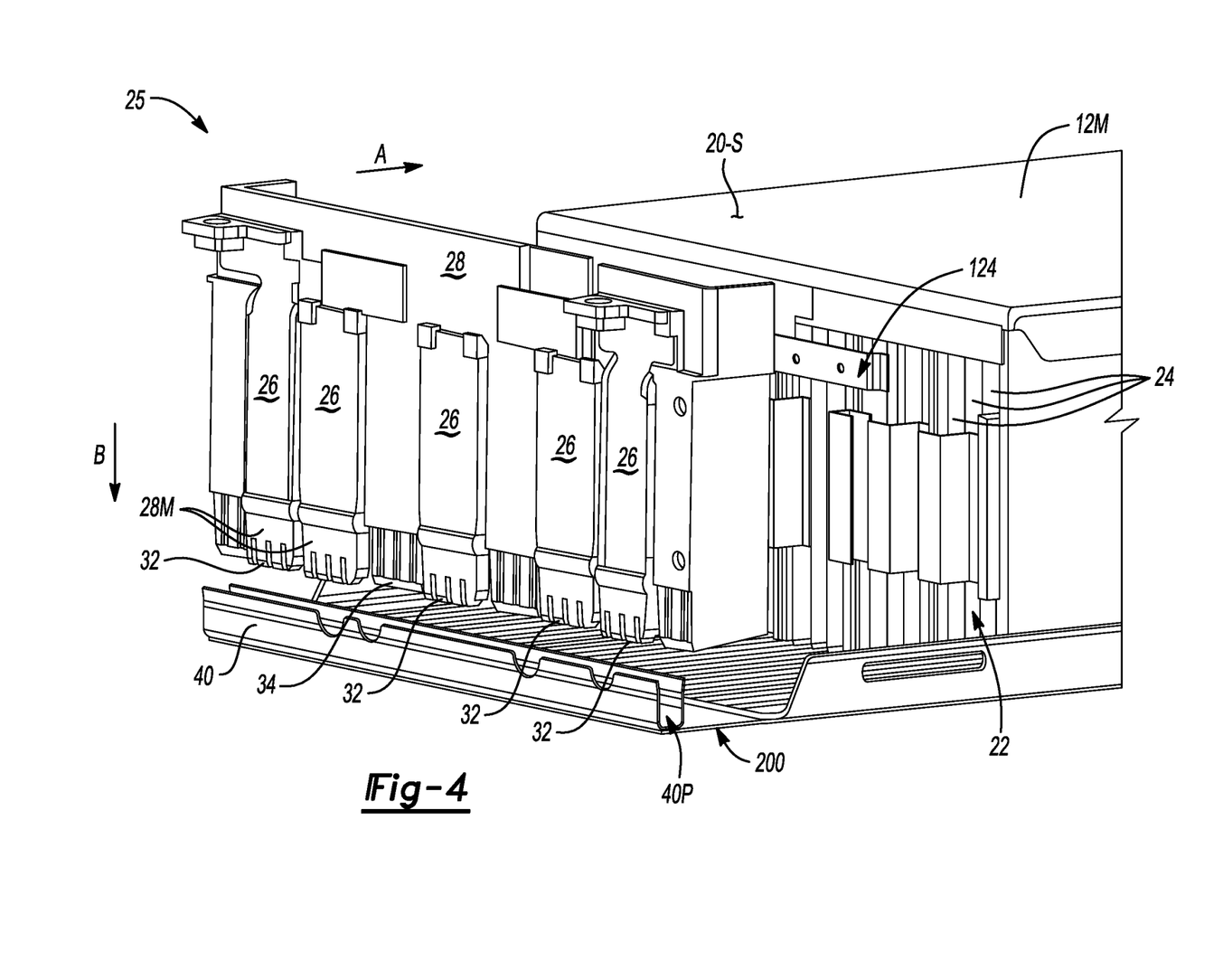
FIG. 4 is a partially-exploded perspective view illustration of a portion of the battery pack depicted in FIG. 2.

Referring to FIG. 2, an exemplary embodiment of the battery module 12M is shown with an external dust cover and internal mounting board removed for illustrative clarity. The battery module 12M includes an outer enclosure or housing 20 within which is disposed a cell stack 22. As best shown in FIG. 4 and well understood in the art, the cell stack 22 includes a plurality of battery cells 24, and thus the battery cells 24 are stacked or otherwise purposefully arranged within the housing 20, which in turn may have nominal top, bottom, and side walls for a given orientation. Each respective battery cell 24 has a pair of cell tabs 124 forming separate cathode and anode electrode extensions of the respective battery cell 24, e.g., at opposing ends of the battery cells 24 in the illustrated configuration.

Figure 3:
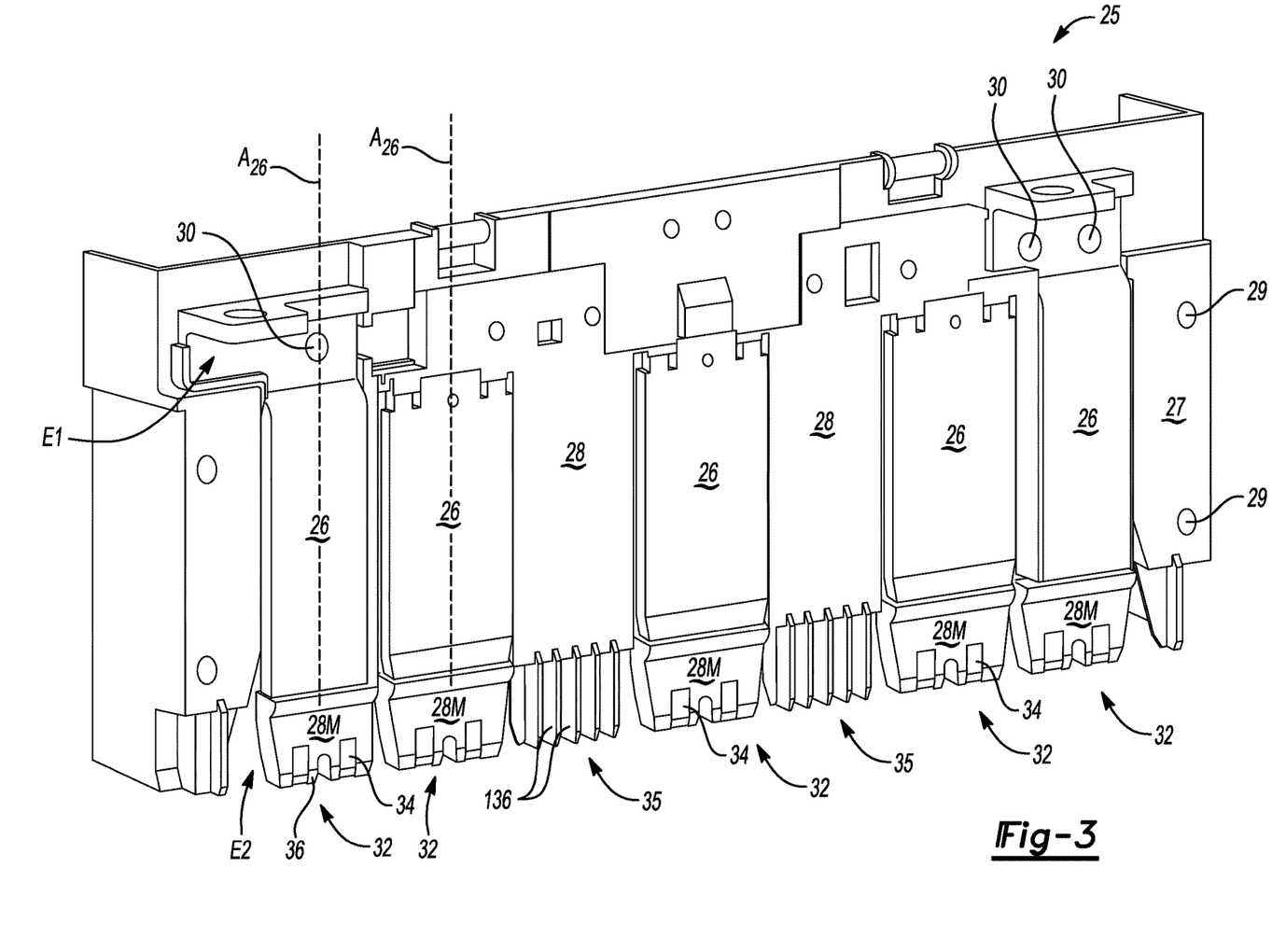
FIG. 3 is a schematic perspective view illustration of an interconnect board assembly that is usable as part of the battery pack shown in FIG. 2.

Referring briefly to FIG. 3, the battery module 12M also includes an interconnect board assembly (ICBA) 25 as an integral part of its construction. According to the present disclosure, the ICBA 25 includes a parallel plurality of conductive busbars 26 of a high-voltage bus. The busbars 26 may be optionally embodied as elongated metal plates having a respective first and second distal ends E1 and E2 and respective longitudinal axis $A_{26}$, with the longitudinal axes $A_{26}$ of the collective set of busbars 26 being mutually parallel. The busbars 26 are constructed from a suitable electrically conductive material, e.g., copper and/or aluminum. Optionally, the busbars 26 may be plated with a thin layer of nickel, tin, or another application-suitable element to facilitate welding and provide other possible performance benefits such as improved wear and tear, corrosion resistance, etc. Ultimately, the busbars 26 are conductively joined to a respective one of the battery cells 24 of FIG. 4 via the cell tabs 124 thereof, e.g., via laser welding, ultrasonic welding, or another suitable conductive joint process, as will be appreciated by those of ordinary skill in the art.

The ICBA 25 of FIG. 2 also includes a flexible or rigid interconnect board (ICB) 28 constructed from a suitable dielectric/electrically non-conductive material. As used herein, the dielectric material is also thermally conductive to facilitate heat transfer according to the present teachings. Mounting flanges 27 with corresponding mounting holes 29 may be included as part of the ICB 28 to enable secure mounting of the ICBA 25 to the battery module 12M of FIG. 2. In various embodiments, the dielectric material may be plastic, e.g., nylon or polypropylene. A thermally-conductive plastic resin or polymer may be used in other embodiments. By way of example, additives such as graphite, graphene, or ceramic fillers may be used with a dielectric base material to further enhance thermal conductivity of the ICB 28.

As shown in FIGS. 2 and 3, the ICB 28 is connected to the busbars 26 overmolded therewith or thereto at the respective first distal end E1, e.g., using a suitable fastener 30 such as a screw, rivet, or stake. At opposing distal end E2 of the busbars 26, the dielectric material used to form the remainder of the ICB 28 is overmolded onto designated portions of each of the busbars 26. Thus, when the ICB 28 is fully formed, the dielectric material wraps around the respective second distal end E2 of each the busbars 26 to form a plurality of overmolded ends 32, with an overmolded surface 28M of the overmolded ends 32 forming a dielectric material layer over an underlying surface area of one of the busbars 26.

In certain embodiments, the dielectric material of the ICB 28 may be overmolded to define one or more windows or through-openings 34 proximate each respective one of the overmolded ends 32. In a non-limiting embodiment, the through-openings 34 for each of the busbars 26 may include multiple side-by-side through-openings 34, which may be of approximately equal size as shown or different sizes and/or shapes. The through-openings 34 extend through the overmolded surface 28M to form windows through the overmolded surface 28M, thereby exposing some of the surface area of the busbars 26 at the second distal ends E2. As will be appreciated, the existence of the optional through-openings 34 may facilitate additional heat transfer from the busbars 26 and into to thermal interface material (TIM) 42 optionally disposed within a bracket pocket 40P of an elongated bracket 40, as described below with reference to FIG. 5. Adjacent to some of the overmolded ends 32, extensions 35 of adject areas of the ICB 28 not overmolded to a corresponding busbar 26 may be used for added location and structural support, with such extensions 35 including ribs 136 that may be configured to engage the elongated bracket 40.

Referring again to FIG. 2, the cooling plate 200 may be arranged along an outer surface 20-S of the battery module 12M and configured to conduct battery coolant (arrow FF of FIG. 1) therethrough. Internal coolant manifold construction of the cooling plate 200 is well understood in the art and, accordingly, is not described further herein for illustrative simplicity. In embodiments in which the cooling plate 200 is not available nearby, other heat sinks may be used in the manner described below, including but not limited to the above-noted walls of the housing 20. Such an alternative approach, as will be appreciated, may require busbars 26 and an ICB 28 of a different shape. As in a typical use of the battery pack 12 the housing 20 rests on or is in thermal communication with the cooling plate 200, heat is absorbed by the housing 20 is ultimately dissipated to the cooling plate 200.

Figure 5:
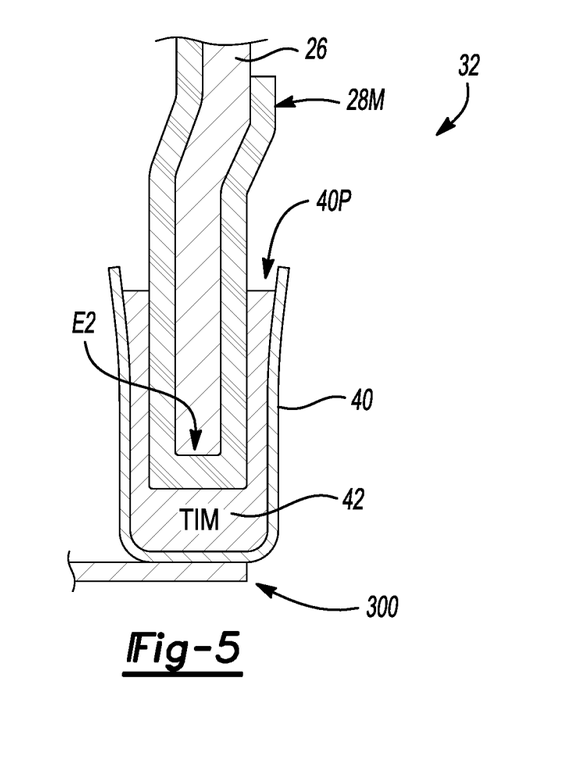
FIG. 5 is a schematic side-view illustration of the ICBA of FIG. 3.

External to the battery pack 12, at least one elongated bracket 40 having a longitudinal axis $A_{40}$ defines a respective bracket pocket 40P (see FIG. 5). The elongated bracket 40 is a single continuous bracket 40 in some embodiments, and may be constructed of a suitable rigid or flexible material, e.g., aluminum, plastic, thermoplastic, or a flexible polymer. Such a bracket 40 would extend fully along a perimeter edge of the cooling plate 200 or along a similar edge of another heat sink, e.g., the housing 20. Alternatively, elongated bracket 40 may be divided into multiple smaller brackets 140 as shown in a phantom line format, e.g., to reduce weight or provide a desired structural response.

In either embodiment, the elongated bracket 40 or 140 defines a respective bracket pocket 40P, either as a single continuous bracket pocket 40P or as multiple discrete bracket pockets 40P. While a generally U-shaped pocket or trough is depicted in the various Figures, other shapes may be envisioned provided the void defined by such a bracket 40 or 140 is capable of holding the TIM 42 and allowing the TIM 42 to solidify from a liquid apply state. Exemplary alternative shapes include but are not limited to V-shaped and L-shaped brackets 40 or 140.

During connection or racking of the ICBA 25 (FIG. 3) to the remainder of the battery module 12M of FIG. 2, each bracket pocket 40P receives therein and engages the overmolded ends 32 of the busbars 26. Depending on the configuration of the bracket 40, this may entail receiving all of the overmolded ends 32 of FIG. 3, and the extensions 35, in a single continuous bracket pocket 40P, or receiving a different one of the overmolded ends 32, possibly excluding the extensions 35, in a respective one of the smaller brackets 140. Multiple direct parallel cooling paths are thereby formed between the busbars 26 and the relevant heat sink to facilitate cooling of the busbars 26 and the cell tabs 124 connected thereto.

Referring to FIG. 5, to enhance transfer of heat from the overmolded end 32 of the power busbar 27 into a heat sink 300, e.g., the housing 20 and/or the above-described cooling plate 200, the TIM 42 may be positioned within the bracket pocket 40P as shown. In different embodiments, the TIM 42 may be a thermally-conductive glue, paste, or pad, e.g., commercially available two-part epoxy adhesives having an application-suitable thermal conductivity. An exemplary thermal conductivity range suitable for battery applications is 1.5-6 W/mK, with required thermal conductivity properties being application-specific, and thus the stated range is illustrative and non-limiting. The TIM 42 may be applied into and along the bracket pocket(s) 40P to partially fill the void defined thereby, e.g., an elongated trough or channel. Once the overmolded ends 32 are inserted into the bracket pocket 40P and engaged with the bracket 40, the TIM 42 and the overmolded surfaces 28M together form a high-voltage barrier between the busbars 26 and the heat sink 300.

As will be appreciated by ordinary skill in the art, the above teachings lend themselves to the practice of a method for constructing the battery module 12M described above. An example embodiment of such a method may include arranging a plurality of the above noted busbars 26 in parallel, i.e., such that the longitudinal axes $A_{26}$ of the busbars 26 are mutually parallel across the ICBA 25 of FIG. 3.

The method may also include overmolding the ICB 28 of FIG. 3 onto the busbars 26 such that the ICB 28 wraps around the respective second distal end E2 of each the busbars 26 to form a plurality of the above-described overmolded ends 32. Once this occurs, the method in this embodiment may include connecting the respective first distal end E1 of each of the busbars 26 to the ICB 28 to thereby form the ICBA 25 of the battery module 12M shown in FIGS. 1, 2, and 4. Exemplary techniques for connecting the first distal end E1 include riveting, staking, and threaded fasteners, to name just a few possibilities.

Some embodiments the method may include conductively joining each of a plurality of the battery cell tabs 124 (see FIG. 2) to a respective one of the plurality of busbars 26. In this manner, one may form a plurality of the cell-to-busbar joints 31, for instance by performing a laser welding, conductive bonding, or ultrasonic welding process to form the cell-to-busbar joints 31.

Depending on the extent to which the various components or subassemblies of the battery module 12M are to be assembled in house or acquired in a preassembled form, the method may include providing the heat sink 300, e.g., the cooling plate 200 of FIGS. 1, 2, 4, and 5. As noted above, the heat sink 300 in accordance with the present disclosure includes or is connected to at least one bracket 40 or 140 defining one or more bracket pockets 40P. The method may include racking the ICBA 25 with the rest of the battery module 12M as indicated by arrow A of FIG. 4, and then welding the cell tabs 124 to the busbars 26 (see FIG. 2). Thereafter, the overmolded ends 32 of FIG. 3 may be inserted into the bracket pocket(s) 40P as indicated by arrow B to thereby form parallel cooling paths, i.e., one cooling path extending from each respective one of the cell-to-busbar joints 31 and the heat sink 300. In other embodiments, the order of connection to the heat sink 300 and welding of the cell tabs 124 may be reversed.

The above-described brackets 40 or 140 may be joined to the heat sink 300 by a supplier/manufacturer in some approaches, such that the heat sink 300 already includes pre-mounted brackets 40 or 140 as an integral part of the construction of the cooling plate 200. Alternatively, the brackets 40 or 140 may be joined to a heat sink 300 lacking such brackets 40 or 140 as part of the production process of the battery module 12M, for instance by welding or conductively bonding the brackets 40 or 140 along a perimeter edge of the heat sink 300.

In either embodiment, the TIM 42 depicted in FIG. 5 may be applied to the brackets 40 or 140 to partially fill the bracket pocket 40P. Additional structural support is provided solidification of the applied TIM 42. The completed ICBA 25 of FIG. 3 is then inserted into the bracket pocket(s) 40P. Once the battery module 12M is constructed in this manner, the method may include connecting the battery module 12M to a load, such as the rotary electric machine 14 of FIG. 1 in the exemplary embodiment of the motor vehicle 10.

The solutions disclosed herein facilitate direct cooling of the cell tabs 124 and busbars 26 of FIG. 2 using passive cooling technology enabled by the specially-adapted cooling plate 200 or other heat sink 300 and the integrated HV barrier features of the overmolded surfaces 28M and TIM 42. The present teachings provide a way to mitigate effects of Joule heating along tab-to-busbar interfaces, including the cell-to-busbar joints 31, with multiple parallel direct thermal paths from high-current conductors to the heat sink 300.

As will be appreciated by one of ordinary skill in the art, the present solutions may help minimize a temperature gradient across the battery module 12M and prevent localized "hot spots" within cell stack 22 of FIGS. 2 and 4. By virtue of mechanical coupling of the ICBA 25 to the battery module 12M and the cooling plate 200, installation of the ICBA 25 may occur in conjunction with assembly of the battery module 12M to help streamline manufacturing. For instance, use of the brackets 40 or 140 enable the brackets 40 or 140 to serve as locating features that the ICBA 25 can rest upon during certain assembly or manufacturing steps.

Additionally, the integrated electrical isolation of the foregoing solutions is flexible depending on a corresponding requirement for high-voltage barrier requirement for the battery pack 12. For instance, the thickness of the overmolded layers 28M (see FIG. 3) may vary, as may the particular grade, material, and/or dielectric strength of such layers 28M. The disclosed installation also provides structural benefits to the battery pack 12 of FIG. 1. That is, once the TIM 42 hardens, and as the bracket 40 or 140 may be metal bonded with the cooling plate 200 or other heat sink 300 in some embodiments, the ICBA 25 and battery pack 12 are effectively reinforced, which in turn provides added robustness, e.g., during road shock/vibrations in the non-limiting embodiment of the motor vehicle 10. These and other potential benefits will be readily appreciated by those of ordinary skill in the art in view of the present teachings.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A battery pack comprising:
    a heat sink;
    a bracket joined to the heat sink, wherein the bracket includes a pair of side walls extending outwardly away from the heat sink such that the bracket defines a bracket pocket between the side walls;
    a housing;
    a plurality of battery cells arranged within the housing; and
    an interconnect board assembly (ICBA) having:
        a parallel set of busbars, wherein each busbar of the parallel set of busbars is conductively joined to one or more of the battery cells via corresponding battery cell tabs of the battery cells; and
        an interconnect board (ICB) constructed from a dielectric material, wherein the dielectric material is overmolded onto a distal end of each respective one of the busbars to form a plurality of overmolded ends, and wherein the overmolded ends extend into the bracket pocket between the side walls such that the overmolded ends are concealed by the side walls and form a cooling path into the heat sink from each of the busbars.

2. The battery pack of claim 1, further comprising: a cooling plate in thermal communication with the housing, wherein the heat sink is the cooling plate.

3. The battery pack of claim 1, wherein the heat sink is the housing.

4. The battery pack of claim 1, wherein each of the overmolded ends is bonded to the bracket within the bracket pocket using a thermal interface material (TIM), such that the TIM and the dielectric material together form a high-voltage barrier between the busbars and the heat sink.

5. The battery pack of claim 1, wherein the bracket is a single continuous bracket arranged along a perimeter edge of the heat sink, and wherein the bracket pocket is a single continuous bracket pocket configured to receive therein the plurality of overmolded ends.

6. The battery pack of claim 1, wherein the bracket includes multiple separate elongated brackets, and the bracket pocket includes a plurality of bracket pockets, wherein each of the bracket pockets corresponds to a respective one of the multiple separate elongated brackets, and wherein each of the bracket pockets is configured to receive therein a different one of the overmolded ends.

7. The battery pack of claim 1, wherein the dielectric material of each of the overmolded ends defines a corresponding through-opening through which a predetermined surface area of the respective busbars is exposed, and the corresponding through-opening is disposed inside of the bracket pocket.

8. The battery pack of claim 1, wherein the dielectric material is nylon or polypropylene.

9. The battery pack of claim 1, wherein the dielectric material is a thermoplastic resin or polymer.

10. The battery pack of claim 1, wherein the battery pack is electrically connected to a rotary electric machine of an electric powertrain and configured to energize rotation thereof.

11. The battery pack of claim 1,
    wherein each of the busbars has a respective first distal end and a respective second distal end, wherein an entrance of the bracket pocket faces upwardly toward the busbars; and
    wherein the ICB is connected to each of the busbars at the respective first distal end, and is overmolded onto each of the busbars such that the dielectric material wraps around the respective second distal end of each of the busbars to form the overmolded ends, and wherein the overmolded ends are configured to extend through the entrance and into the bracket pocket during assembly of the battery pack.

12. The battery pack of claim 11, wherein the dielectric material of each of the overmolded ends defines at least one corresponding through-opening through which a predetermined surface area of the busbars is exposed, and the corresponding through-opening is disposed inside of the bracket pocket.

13. The battery pack of claim 12, wherein the at least one corresponding through-opening includes multiple through-openings of approximately the same size and shape.

14. The battery pack of claim 11, wherein an extension of the ICB adjacent to one of the overmolded ends includes ribs configured to engage the bracket.

15. A method for constructing a battery pack for use with a heat sink having a bracket joined thereto, wherein the bracket includes a pair of side walls extending outwardly away from the heat sink such that the bracket defines a bracket pocket between the side walls, the method comprising:
    arranging a plurality of busbars in parallel, wherein each of the busbars is constructed from a plate of an electrically conductive material, and has a respective first distal end and a respective second distal end;

overmolding a dielectric material of a plastic interconnect board (ICB) onto the respective second distal end of each of the busbars to form a plurality of overmolded ends;

attaching the respective first distal end of each of the busbars to the plastic ICB to thereby form an ICB assembly of the battery pack;

providing a plurality of battery cells, wherein each respective battery cell of the plurality of battery cells has battery cell tabs that protrude as electrode extensions from one or more edges of the respective battery cell;

conductively joining respective battery cell tabs to respective busbars to form a plurality of cell-to-busbar joints;

connecting the bracket to the heat sink, the bracket defining the bracket pocket therein; and inserting the plurality of overmolded ends into the bracket pocket to thereby engage the bracket, such that the overmolded ends extend into the bracket pocket between the side walls such that the overmolded ends are concealed by the side walls, and the respective overmolded ends form a cooling path between respective cell-to-busbar joints and the heat sink.

16. The method of claim 15, wherein the heat sink includes a cooling plate or a housing of the battery pack.

17. The method of claim 16, wherein connecting the bracket to the heat sink includes welding or bonding the bracket to an edge of the cooling plate or the housing.

18. The method of claim 17, further comprising: connecting the battery pack to a rotary electric machine of an electric powertrain.

* * * * *